(12) United States Patent
Voltz

(10) Patent No.: US 12,514,408 B2
(45) Date of Patent: *Jan. 6, 2026

(54) SHAMPOO SUPPORT APPARATUS AND METHOD FOR USE OF SAME

(71) Applicant: Kia-Shun Voltz, Cedar Hill, TX (US)

(72) Inventor: Kia-Shun Voltz, Cedar Hill, TX (US)

( * ) Notice: Subject to any disclaimer, the term of this patent is extended or adjusted under 35 U.S.C. 154(b) by 168 days.

This patent is subject to a terminal disclaimer.

(21) Appl. No.: 18/488,543

(22) Filed: Oct. 17, 2023

(65) Prior Publication Data

US 2024/0041269 A1     Feb. 8, 2024

Related U.S. Application Data

(63) Continuation of application No. 16/846,302, filed on Apr. 11, 2020, now Pat. No. 11,786,080.

(51) Int. Cl.
| | |
|---|---|
| *A47K 3/12* | (2006.01) |
| *A47D 1/00* | (2006.01) |
| *A47D 15/00* | (2006.01) |
| *F16M 13/02* | (2006.01) |

(52) U.S. Cl.
CPC .............. *A47K 3/127* (2013.01); *A47D 1/002* (2013.01); *A47D 15/006* (2013.01); *F16M 13/022* (2013.01)

(58) Field of Classification Search
CPC ....... A47K 3/127; A47D 1/002; A47D 15/006
See application file for complete search history.

(56) References Cited

U.S. PATENT DOCUMENTS

| | | | |
|---|---|---|---|
| 2,463,049 A | 3/1949 | Onsa | |
| 2,908,465 A * | 10/1959 | Lykes | A47B 23/007 |
| | | | 248/460 |
| 3,633,222 A | 1/1972 | Greenfield | |
| 3,894,709 A | 7/1975 | Weir | |
| D267,599 S | 1/1983 | Fator | |
| 4,754,503 A | 7/1988 | Martin | |
| 5,548,853 A | 8/1996 | Johnson | |
| D386,318 S | 11/1997 | Smith | |
| D425,245 S | 5/2000 | Davis | |
| D446,676 S | 8/2001 | Mayes | |
| 6,905,169 B1 | 6/2005 | Donoghue | |
| 8,191,184 B2 | 6/2012 | Gibson et al. | |
| 9,091,392 B1 | 7/2015 | Addington | |
| 9,204,716 B2 | 12/2015 | Carter | |
| 9,596,942 B2 * | 3/2017 | Kubota | A47C 7/383 |
| 11,039,689 B1 | 6/2021 | Voltz | |
| 2010/0186160 A1 | 7/2010 | Romano | |
| 2013/0263377 A1 | 10/2013 | Wooten, Jr. | |
| 2014/0359932 A1 | 12/2014 | Dutton | |

* cited by examiner

*Primary Examiner* — Janie M Loeppke
(74) *Attorney, Agent, or Firm* — Scott Griggs; Griggs Bergen LLP

(57) ABSTRACT

A shampoo support apparatus and method for use of the same are disclosed. In one embodiment of the shampoo support apparatus, a body is configurable between a reclining configuration and a booster seat configuration. In the reclining configuration, the body provides a neck support and a back support. A support structure that may be placed above the body is configured to accept and secure a smart device thereat and support the smart device at a smart device working distance from the neck support. In the booster seat configuration, the body folds into a rectangular shape to provide a seat.

20 Claims, 5 Drawing Sheets

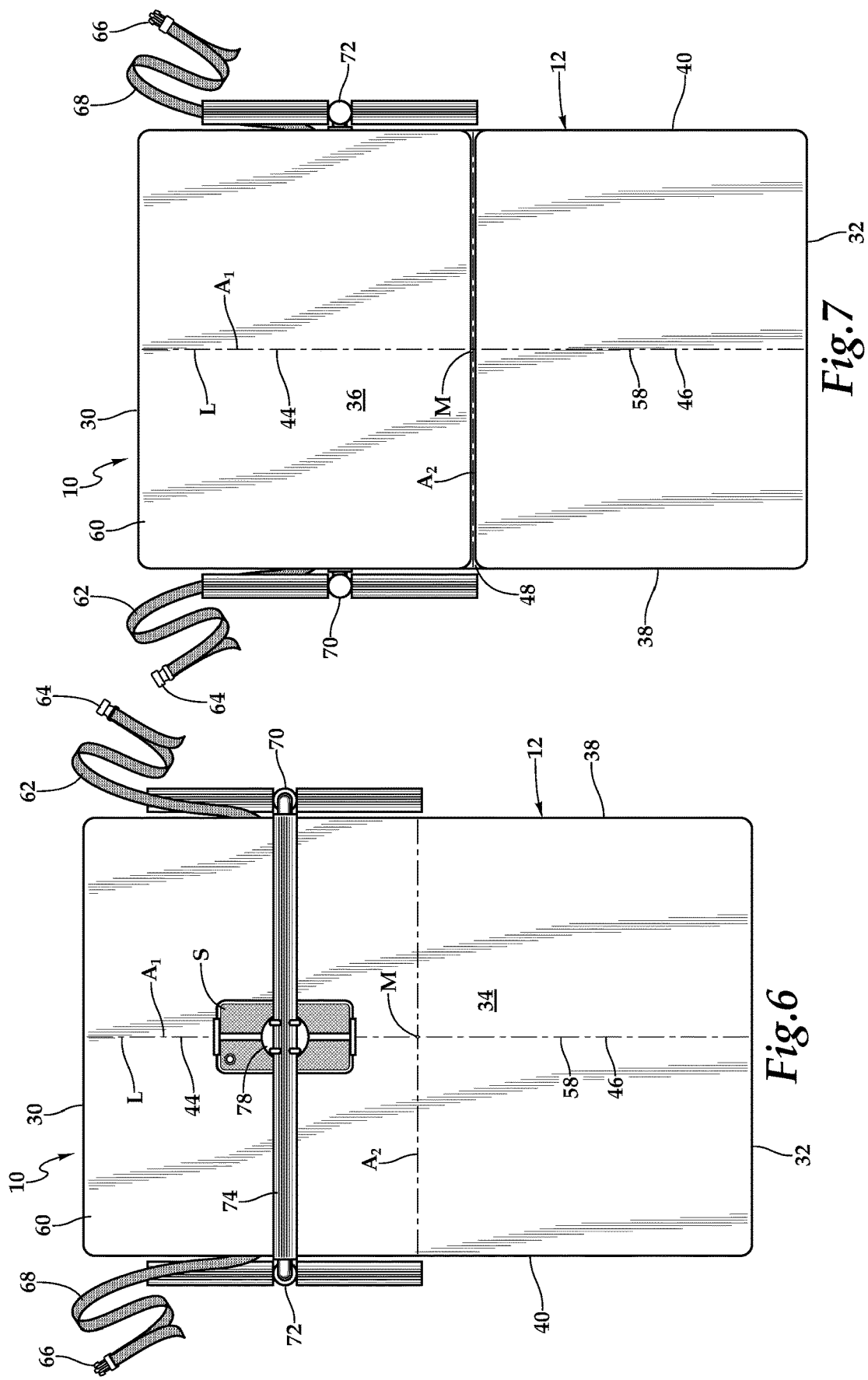

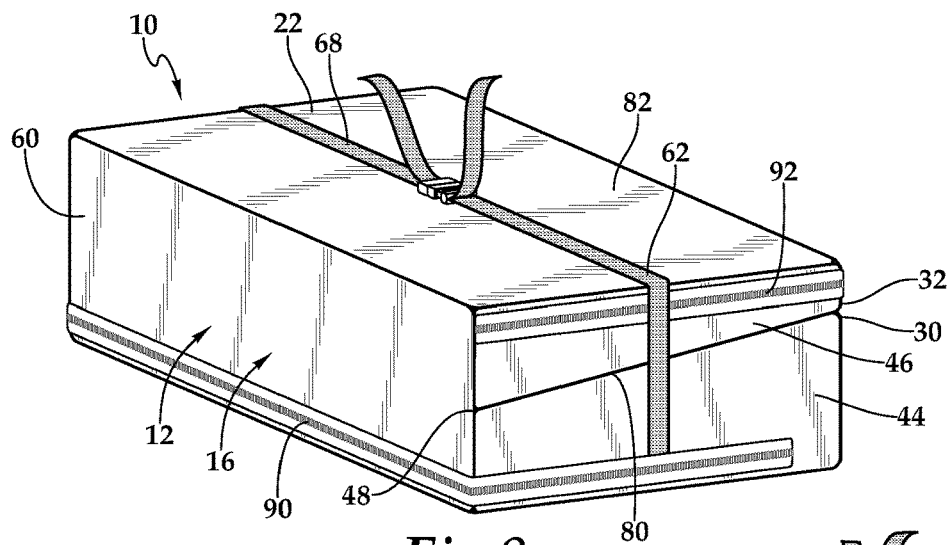
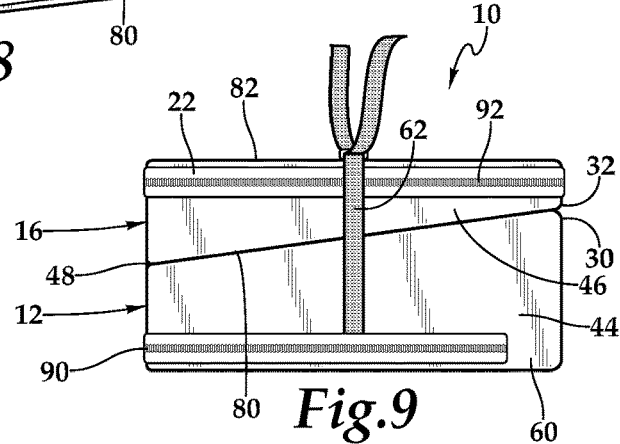
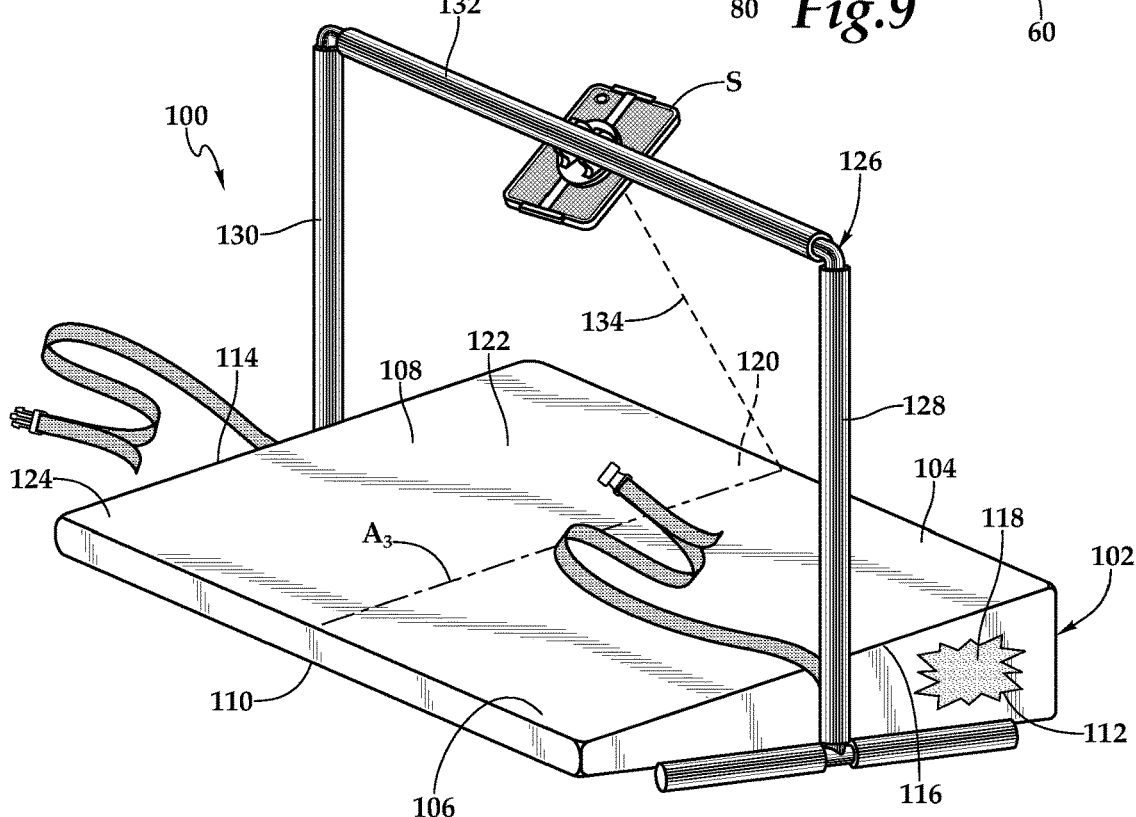

SHAMPOO SUPPORT APPARATUS AND METHOD FOR USE OF SAME

PRIORITY STATEMENT & CROSS-REFERENCE TO RELATED APPLICATIONS

This application is a continuation of U.S. application Ser. No. 16/846,302 entitled "SHAMPOO SUPPORT APPARATUS AND METHOD FOR USE OF SAME" filed on Apr. 11, 2020 in the name of Kia-Shun Voltz, now U.S. patent Ser. No. 11/786,080 issued on Oct. 17, 2023; which is hereby incorporated by reference, in entirety, for all purposes.

TECHNICAL FIELD OF THE INVENTION

This invention relates, in general, to cushions and, in particular, to a shampoo support apparatus and method for use of the same that may be utilized when shampooing an individual's, such as a child's, hair.

BACKGROUND OF THE INVENTION

When shampooing an individual's hair and particularly a child's hair, it is necessary to extend the child's head over a sink or basin, for example, while wetting the hair and performing other steps associated with shampooing, such as applying shampoo and rinsing the hair. During this process, the child's neck must be supported, and the child's body stabilized, while maintaining comfort. The child may lose stability in response to shifting during shampooing or washing as the child turns or moves about and, as a result, there is a continuing need for an improved design that also meets expectations of ever-increasing safety, comfort, and convenience.

SUMMARY OF THE INVENTION

It would be advantageous to achieve a shampoo support apparatus and method for use of the same that may be utilized when shampooing an individual's, such as a child's, hair. It would also be desirable to enable a mechanical solution that satisfies comfort while mitigating or eliminating the chances of the individual, such as the child, losing stability in response to shifting during shampooing or washing. It would be further desirable to enhance convenience. To better address one or more of these concerns, a shampoo support apparatus and method for use of the same are disclosed.

In one embodiment of the shampoo support apparatus, a body is configurable between a reclining configuration and a booster seat configuration. In the reclining configuration, the body provides a neck support and back support. A support structure that may be placed above the body is configured to accept and secure a smart device thereat and support a smart device at a smart device working distance from the neck support. In the booster seat configuration, the body folds into a rectangular shape to provide a seat. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 6 is a top plan view of the shampoo support apparatus depicted in FIG. 3;

FIG. 7 is a bottom plan view of the shampoo support apparatus depicted in FIG. 3;

FIG. 8 is a front perspective view of the shampoo support apparatus in the booster seat configuration, without a child, depicted in FIG. 2;

FIG. 9 is a side elevation view of the shampoo support apparatus depicted in FIG. 8; and FIG. 10 is a front perspective view of another embodiment of a shampoo support apparatus according to some of the teachings presented herein.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention and do not delimit the scope of the present invention.

Figure 1:
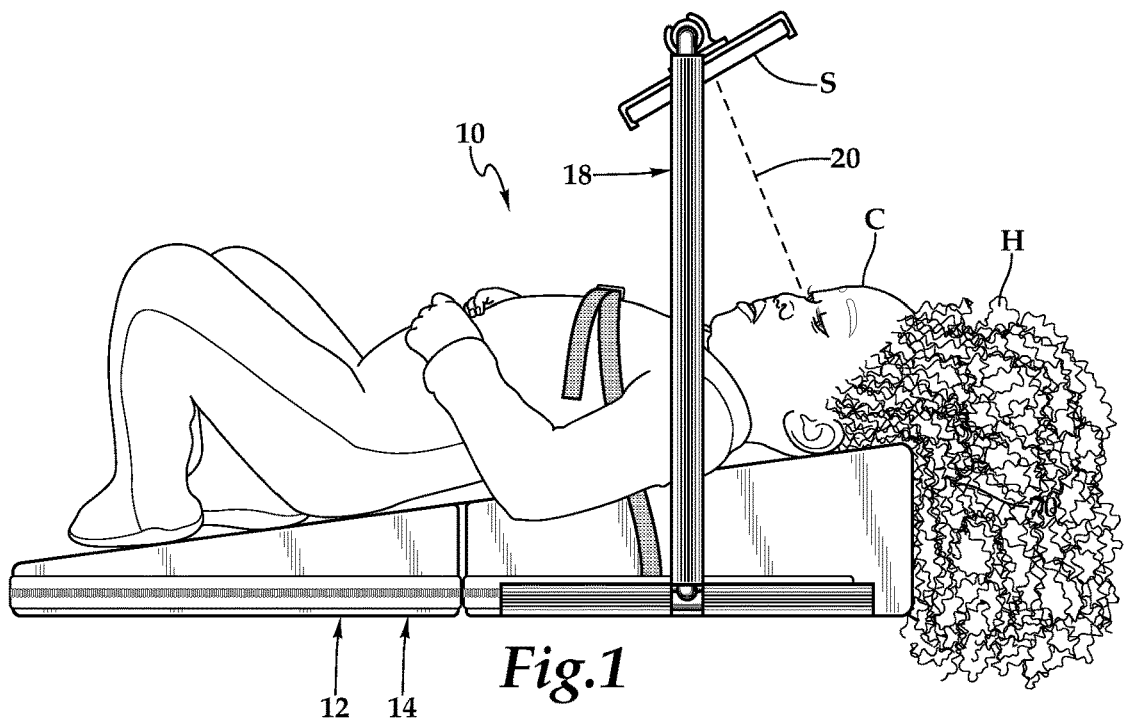
FIG. 1 is a side elevation view of one embodiment of a child reclining in a shampoo support apparatus in a reclining configuration according to some of the teachings presented herein.
Figure 2:
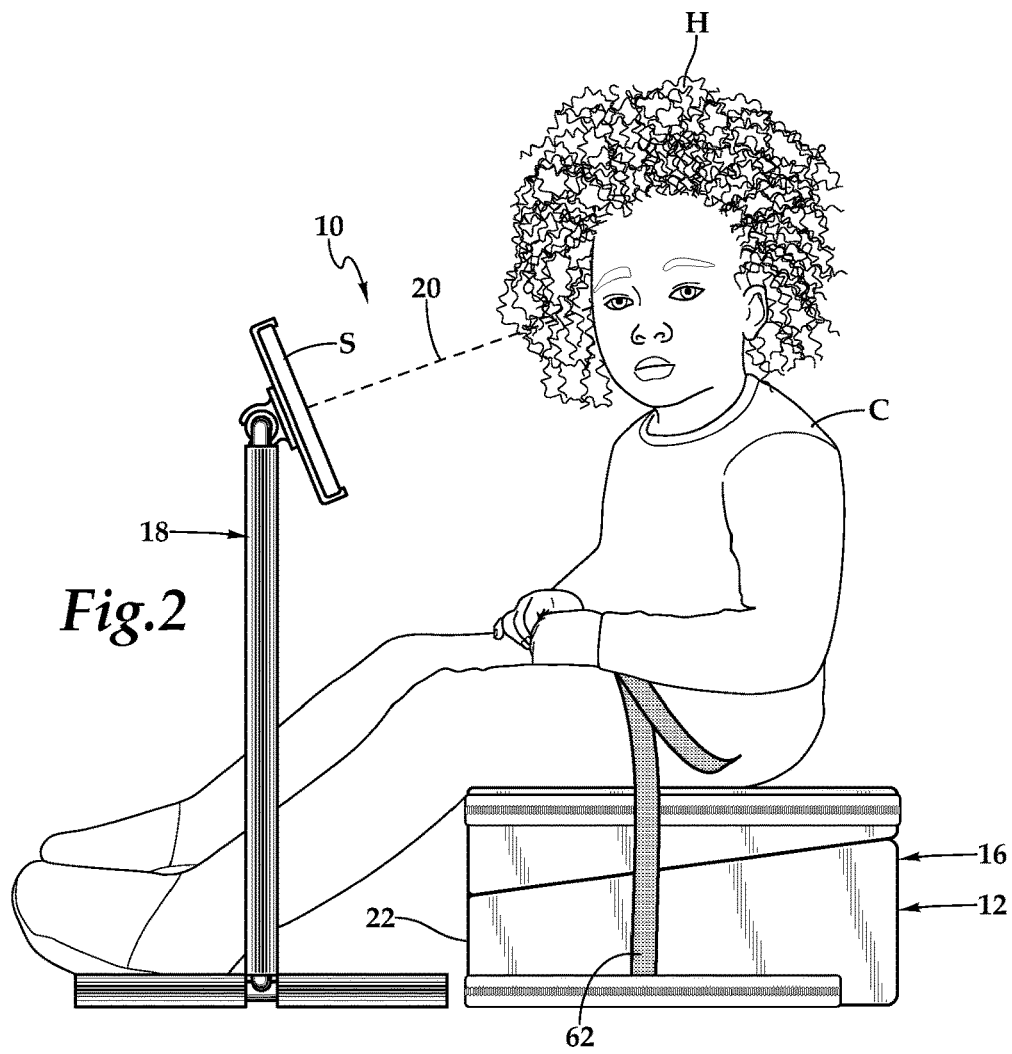
FIG. 2 is a side elevation view of one embodiment of the child sitting in the shampoo support apparatus in a booster seat configuration according to some of the teachings presented herein.
Figure 3:
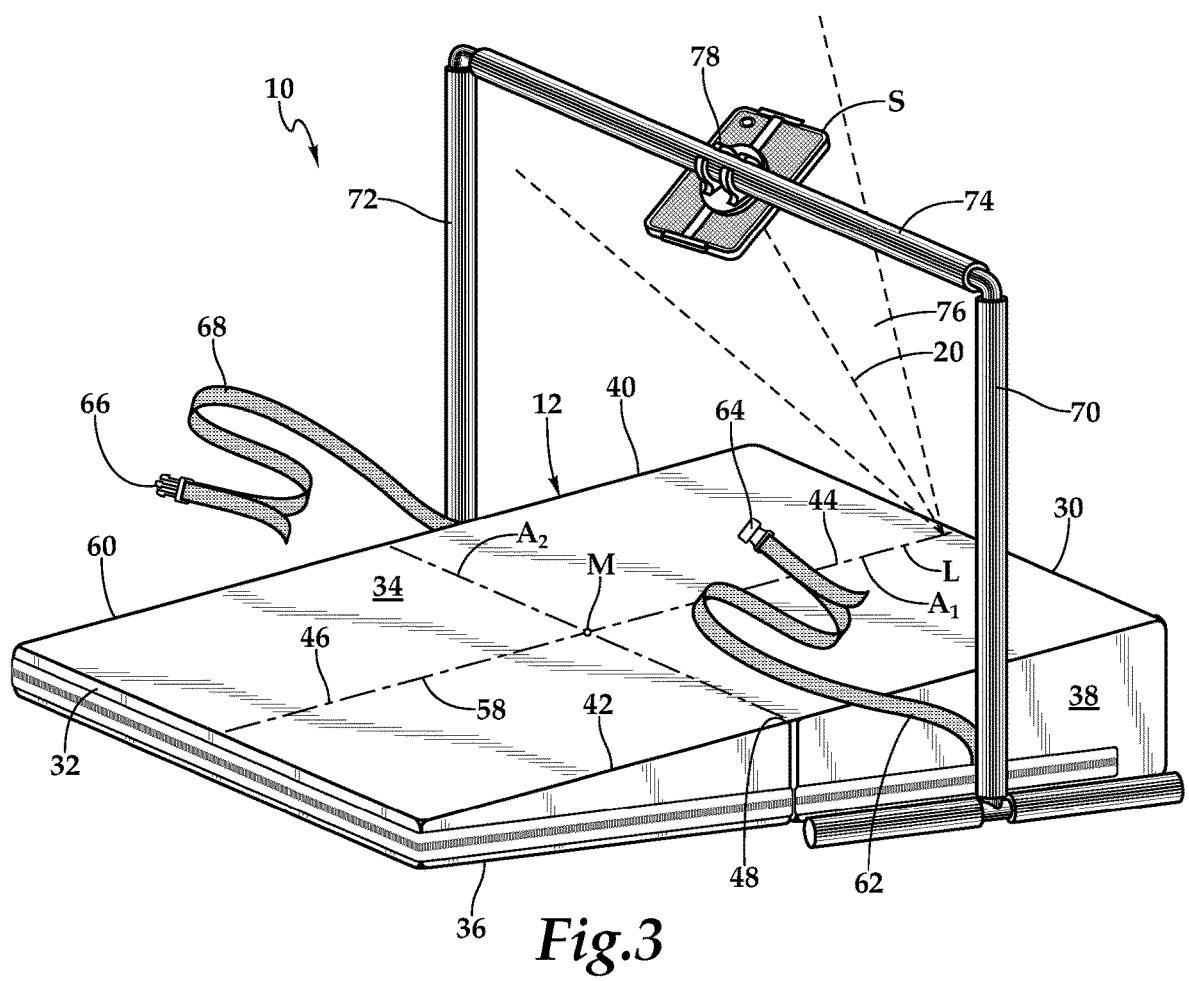
FIG. 3 is a front perspective view of the shampoo support apparatus in the reclining configuration, without a child, depicted in FIG. 1.
Figure 4:
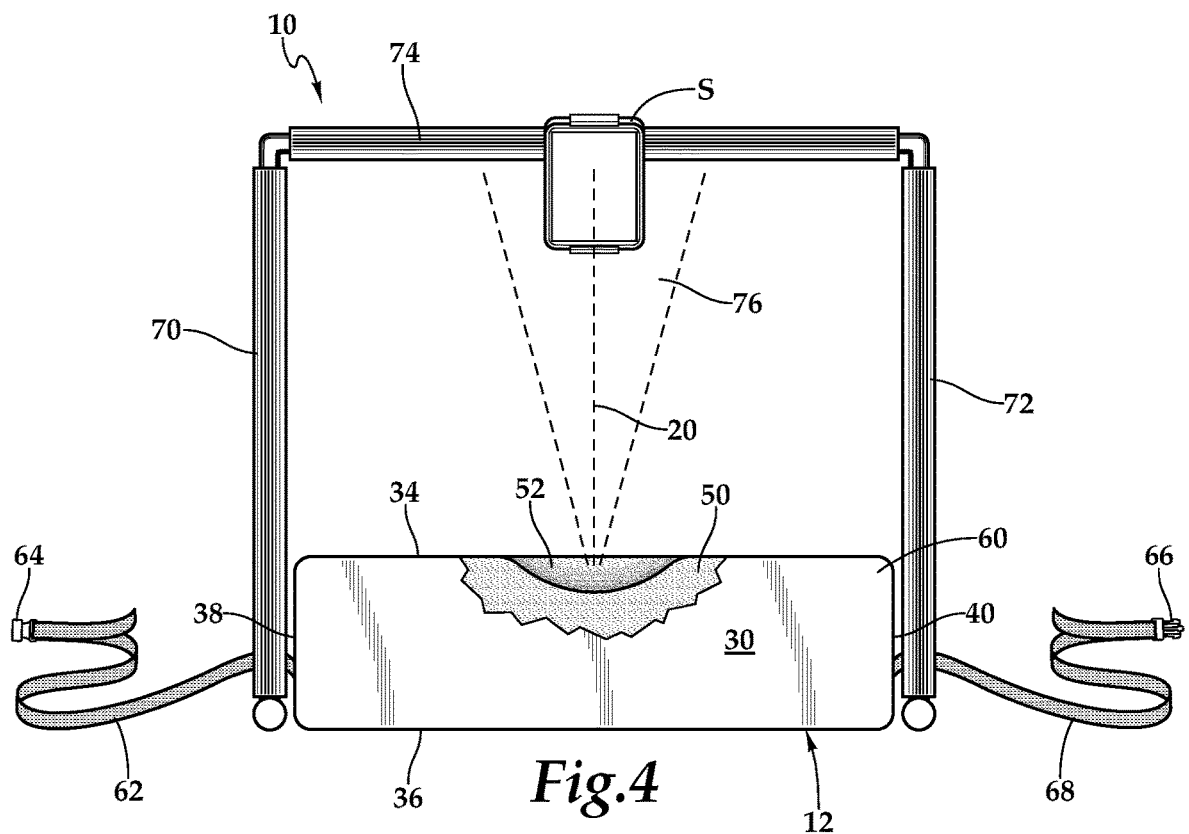
FIG. 4 is a rear elevation view, in partial breakaway, of the shampoo support apparatus depicted in FIG. 3.
Figure 5:
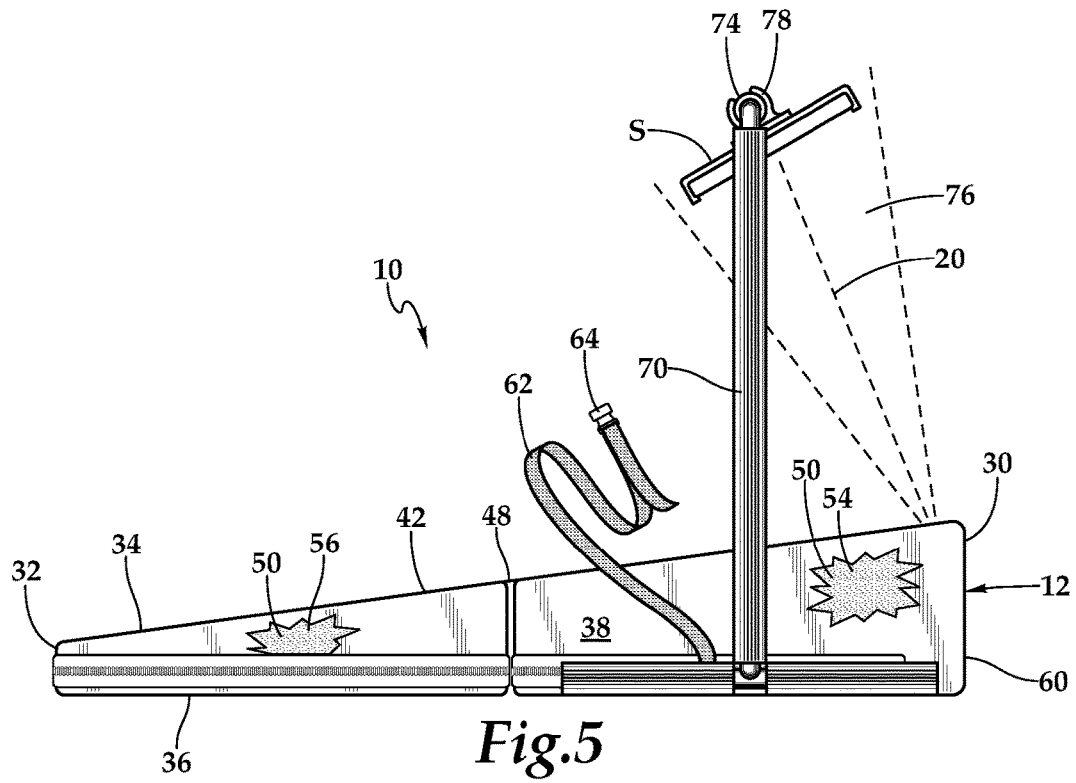
FIG. 5 is a side elevation view, in partial breakaway, of the shampoo support apparatus depicted in FIG. 3.

Referring now to FIG. 1 and FIG. 2, therein is depicted one embodiment of a shampoo support apparatus that is schematically illustrated and generally designated 10. A body 12 of the shampoo support apparatus 10 is configurable between a reclining configuration 14 and a booster seat configuration 16. In the reclining configuration 14, the body 12 provides neck support and back support to an individual, such as a child C, while the child's hair H is being shampooed and washed. A support structure 18 placed above the body 12 is configured to accept and secure a smart device S, such as a smart phone or tablet computer, for example, at a smart device working distance 20 from the body 12. In the reclining configuration 14, the shampoo support apparatus 10 may be placed adjacent to a sink or basin, for example, and the child C may be supine positioned such that the neck of the child C is supported and the child's hair H extends over the sink or basin. A care giver, such as a parent of the child C, may then wet the child's hair H and perform other steps associated with shampooing, such as applying shampoo and rinsing the child's hair H. During this process, the neck of the child C remains supported by the shampoo support apparatus 10 and the body of the child C is stabilized, while maintaining comfort. Additionally, the support structure 18 provides a distraction by way of entertainment to the child C. The support structure 18 holds the smart device S for enjoying content at the smart device working distance 20.

In the booster seat configuration 16, the body 12 folds into a rectangular shape 22 to provide a seat for an individual, such as the child C. Alternatively, the booster seat configuration 16 offers a tight form factor suitable for storage when the shampoo support apparatus 10 is not in use. In one implementation, following the shampooing of the child's hair H, the shampoo support apparatus 10 may be reconfigured from the reclining configuration 14 to the booster seat configuration 16. In the booster seat configuration 16, the child C may sit while the child's hair H dries, or other hair care and hair styling operations are applied.

Referring now to FIG. 3 through FIG. 7, in some embodiments, the body 12 of the shampoo support apparatus 10 includes an upper end 30, a lower end 32, a top surface 34, a bottom surface 36, a side 38, and a side 40. The top surface 34 may include an inclined plane 42 tapering from the upper end 30 to the lower end 32. As shown, the body 12 includes a longitudinal axis $A_1$ from the upper end 30 to the lower end 32 with the longitudinal axis $A_1$ having a longitudinal length L. The longitudinal length L includes a midpoint M and a mediolateral axis $A_2$ bisecting the midpoint M to create an upper longitudinal length body segment 44 and a lower longitudinal length body segment 46. The upper longitudinal length body segment 44 and the lower longitudinal length body segment 46 form the body 12. In one implantation, the upper longitudinal length body segment 44 and the lower longitudinal length body segment 46 have an identical length as well as identical width.

A flexure bearing hinge 48 joins the upper longitudinal length body segment 44 and the lower longitudinal length body segment 46 at the mediolateral axis $A_2$. The upper longitudinal length body segment 44 includes a cushioning material 50 forming a neck support 52 at an intersection of the upper end 30 and top surface 34. The cushioning material 50 forms an upper back support 54 on the top surface 34 from the neck support 52 to the mediolateral axis $A_2$. The lower longitudinal length body segment 46 includes the cushioning material 50 forming a lower back support 56 on the top surface 34 from the mediolateral axis $A_2$ to the lower end 32. The upper back support 54 and the lower back support 56, in combination, providing a continuous transition therebetween. Moreover, the top surface 34 of the upper longitudinal length body segment 44 and the top surface 34 of the lower longitudinal length body segment 46, in combination, provide a size 58 to accommodate a back of the child C. An outer cover 60, which may include a water-resistant polymer, provides an envelope over the cushioning material 50, the outer cover 60 including a water-resistant polymer. The flexure bearing hinge 48 may include the outer cover 60.

As shown, a strap 62 is secured to the side 38 at the upper longitudinal length body segment 44. As shown, the strap 62 has a fastener portion 64 that is configured to mate with a fastener portion 66 which is coupled to a strap 68. The strap 68 is secured to the side 40 at the upper longitudinal length body segment 44, opposite the strap 62. The straps 62, 68, when fastened, have a girth for securing a torso of the child C therein and against the top surface 34 of the upper longitudinal length body segment 44.

In some embodiments, the support structure 18 includes spaced vertical support members 70, 72 supporting a horizontal support member 74 therebetween. As previously alluded, the horizontal support member 74 is supported at the smart device working distance 20 from the body 12 and, in particular, from the neck support 52. The smart device working distance 20 may be about 10 inches (25 centimeters) to about 15 inches (38 centimeters). In another implementation, the smart device working distance 20 is about 12 inches (30 centimeters). As shown, the smart device working distance 20 is within a line-of-sight viewing corridor 76 extending perpendicular to the longitudinal axis $A_1$ from the neck support 52 to the horizontal support member 74. The line-of-sight viewing corridor 76 provides unobstructed visibility of the horizontal support member 74 and, by extension, the smart device S. In some implementations, a connector 78 is positioned on the horizontal support member 74 and the connector 78 is configured to accept and secure the smart device S thereat.

Referring now to FIG. 8 and FIG. 9, the body 12 is shown in the booster seat configuration 16 wherein the lower longitudinal length body segment 46 folds along the flexure bearing hinge 48 onto the upper longitudinal length body segment 44 such that the lower end 32 contacts the upper end 30. In the booster seat configuration 16, the upper longitudinal length body segment 44 including the cushioning material 50 forms a seat 80 at the top surface 34. Also, in the booster seat configuration 16, the lower longitudinal length body segment 46 including the cushioning material 50 forms a seat 82 at the bottom surface 36. Also, in the booster seat configuration 16, the neck support 52 is in an interior of the body 12. As shown, the body 12 is the rectangular shape 22 in the booster seat configuration 16. The straps 62, 68, when fastened, have a girth for securing the body 12 in the rectangular shape 22.

With respect to the booster seat configuration 16, as best seen in FIG. 2, the spaced first and second vertical support members 70, 72 support the horizontal support member 74 therebetween and positioned adjacent to the body 12. As previously discussed, the horizontal support member 74 is supported at the smart device working distance 20 from the body 12. In the booster seat configuration 16, the line-of-sight viewing corridor 76 extends from a position above the body 12 proximate the head of the child C, to the horizontal support member 74 and the line-of-sight viewing corridor 76 provides unobstructed visibility of the horizontal support member 74, which may be retaining the smart device S for viewing by the child C.

As constructed, in one embodiment, the shampoo support apparatus 10 may be designed as a continuous form of pliable foam material of constant or appropriately varying density that varies in thickness to provide the cushioning material 50 having the outer cover 60 serving as protection coating thereon. The construction may include molded foam being provided by a single molding process. In one embodiment, the construction includes slabs of closed cell polyurethane foam, such as closed cell polyurethane foam F, having a density in the range of approximately 1 lbs/ft3 (16 kg/m3) to approximately 6 lbs/ft3 (96 kg/m3). The outer cover 60, which is waterproof, may be applied by various processes, including dipping and spraying, for example. The outer cover 60 may be a polyvinyl chloride (PVC) material V. In one embodiment, the outer cover 60 may be filled with the cushioning material 50 by way of zippered openings 90, 92 or, alternatively, filled using a process not requiring zippered openings 90, 92. It should be appreciated that although a particular construction and materials are presented, the construction of the shampoo support apparatus 10 may vary according to the particular application and other constructions and choices of materials within the teachings presented herein.

As previously alluded, special care should be taken in the consideration of the shampoo support apparatus 10 to provide sufficient material strength to maintain the occupant in a stable orientation while the occupant is in a reclining position during shampooing. Such special care is warranted to prevent the shampoo support apparatus 10 from shifting off its center of gravity as the occupant may turn or move about during the shampooing and as the occupant experiences a care giver interacting with the occupant's hair.

In one embodiment of the shampoo support apparatus 10, the structural integrity is sufficient to support an occupant having a body weight of 250 lbs (113 kg).

Referring now to FIG. 10, another embodiment of a shampoo support apparatus 100 is depicted, which is a smaller or "mini" version of the shampoo support apparatus 10 previously discussed. A body 102 includes an upper end 104, a lower end 106, a top surface 108, a bottom surface 110, a first side 112, and a second side 114. The top surface 108 includes an inclined plane 116 tapering from the upper end 104 to the lower end 106. As shown, the body 102 includes a longitudinal axis $A_3$ from the upper end 104 to the lower end 106.

The body 102 includes a cushioning material 118 forming a neck support 120 at an intersection of the upper end 104 and top surface 108. The cushioning material 118 forms an upper back support 122 on the top surface 108 from the neck support 120 to the lower end 106. An outer cover 124 provides an envelope over the cushioning material 118. The outer cover 124 may include a water-resistant polymer. A support structure 126 includes spaced vertical support members 128, 130 supporting a horizontal support member 132 therebetween. The horizontal support member 132 is supported at a smart device working distance from the neck support 120. A line-of-sight viewing corridor 134 extends perpendicular to the longitudinal axis $A_3$ from the neck support 120 to the horizontal support member 132 such that the line-of-sight viewing corridor 134 furnishes an unobstructed visibility of the horizontal support member 132.

The order of execution or performance of the methods and operations illustrated and described herein is not essential, unless otherwise specified. That is, elements of the methods and flows may be performed in any order, unless otherwise specified, and that the methods may include more or less elements than those disclosed herein. For example, it is contemplated that executing or performing a particular step before, contemporaneously with, or after another step are all possible sequences of execution.

While this invention has been described with reference to illustrative embodiments, this description is not intended to be construed in a limiting sense. Various modifications and combinations of the illustrative embodiments as well as other embodiments of the invention will be apparent to persons skilled in the art upon reference to the description. It is, therefore, intended that the appended claims encompass any such modifications or embodiments.

What is claimed is:

1. A shampoo support apparatus comprising:
   a body having an upper end, a lower end, a top surface, a bottom surface, a first side, and a second side;
   the top surface including an inclined plane and the top surface tapering from the upper end to the lower end;
   the body including a longitudinal axis from the upper end to the lower end, the longitudinal axis having a longitudinal length;
   the longitudinal length including a midpoint and a mediolateral axis bisecting the midpoint creating an upper longitudinal length body segment and a lower longitudinal length body segment, the upper longitudinal length body segment and the lower longitudinal length body segment forming the body, the upper longitudinal length body segment and the lower longitudinal length body segment having an identical length as well as an identical width;
   a flexure bearing hinge joining the upper longitudinal length body segment and the lower longitudinal length body segment at the mediolateral axis;
   the upper longitudinal length body segment including a cushioning material forming a neck support at an intersection of the upper end and the top surface, the cushioning material forming an upper back support on the top surface from the neck support to the mediolateral axis;
   the lower longitudinal length body segment including the cushioning material forming a lower back support on the top surface from the mediolateral axis to the lower end, the upper back support and the lower back support, in combination, providing a continuous transition therebetween;
   an outer cover providing an envelope over the cushioning material, the outer cover including a water-resistant polymer;
   a support structure consisting essentially of a vertical support member supporting a horizontal support member, the horizontal support member being supported at a smart device working distance from the neck support, and the horizontal support member having a connector securable to a plurality of positions along the horizontal support member, the connector configured to accept and secure a smart device thereat;
   a line-of-sight viewing corridor extending perpendicular to the longitudinal axis from the neck support to the horizontal support member, the line-of-sight viewing corridor providing unobstructed visibility of the horizontal support member; and
   the body having a booster seat configuration wherein the lower longitudinal length body segment folds along the flexure bearing hinge onto the upper longitudinal length body segment such that the lower end contacts the upper end.

2. The shampoo support apparatus as recited in claim 1, wherein in the booster seat configuration, the upper longitudinal length body segment including the cushioning material forms a first seat at the top surface.

3. The shampoo support apparatus as recited in claim 1, wherein in the booster seat configuration, the lower longitudinal length body segment including the cushioning material forms a second seat at the bottom surface.

4. The shampoo support apparatus as recited in claim 1, wherein in the booster seat configuration, the neck support is in an interior of the body.

5. The shampoo support apparatus as recited in claim 1, wherein in the booster seat configuration, the body being a rectangular shape.

6. The shampoo support apparatus as recited in claim 1, wherein in the booster seat configuration, the horizontal support member being supported at the smart device working distance from the body.

7. The shampoo support apparatus as recited in claim 1, wherein in the booster seat configuration, the line-of-sight viewing corridor extends from a position above the body to the horizontal support member, the line-of-sight viewing corridor providing unobstructed visibility of the horizontal support member.

8. The shampoo support apparatus as recited in claim 1, further comprising:
a first strap secured to the first side at the upper longitudinal length body segment, the first strap having a first fastener portion configured to mate with a second fastener portion;
a second strap secured to the second side at the upper longitudinal length body segment, the second strap having the second fastener portion; and
the first strap and the second strap, when fastened, have a girth for securing a torso of a child therein and against the top surface of the upper longitudinal length body segment.

9. The shampoo support apparatus as recited in claim 1, wherein the top surface of the upper longitudinal length body segment and the top surface of the lower longitudinal length body segment, in combination, further comprise a size to accommodate a back of a child.

10. The shampoo support apparatus as recited in claim 1, wherein the cushioning material further comprises closed cell polyurethane foam.

11. The shampoo support apparatus as recited in claim 1, wherein the outer cover further comprises a polyvinyl chloride (PVC) material.

12. The shampoo support apparatus as recited in claim 1, wherein the flexure bearing hinge further comprises the outer cover.

13. The shampoo support apparatus as recited in claim 1, wherein the smart device working distance further comprises of about 10 inches (25 centimeters) to about 15 inches (38 centimeters).

14. A shampoo support apparatus comprising:
a body having an upper end, a lower end, a top surface, a bottom surface, a first side, and a second side;
the top surface including an inclined plane and the top surface tapering from the upper end to the lower end;
the body including a longitudinal axis from the upper end to the lower end, the longitudinal axis having a longitudinal length;
the longitudinal length including a midpoint and a mediolateral axis bisecting the midpoint creating an upper longitudinal length body segment and a lower longitudinal length body segment, the upper longitudinal length body segment and the lower longitudinal length body segment forming the body;
a flexure bearing hinge joining the upper longitudinal length body segment and the lower longitudinal length body segment at the mediolateral axis;
the upper longitudinal length body segment including a cushioning material forming a neck support at an intersection of the upper end and the top surface, the cushioning material forming an upper back support on the top surface from the neck support to the mediolateral axis;
the lower longitudinal length body segment including the cushioning material forming a lower back support on the top surface from the mediolateral axis to the lower end, the upper back support and the lower back support, in combination, providing a continuous transition therebetween;
an outer cover providing an envelope over the cushioning material, the outer cover including a water-resistant polymer;
a support structure consisting essentially of a vertical support member supporting a horizontal support member, the horizontal support member being supported at a smart device working distance from the neck support, the smart device working distance being about 10 inches (25 centimeters) to about 15 inches (38 centimeters), the horizontal support member having a connector securable to a plurality of positions along the horizontal support member, the connector configured to accept and secure a smart device thereat; and
a line-of-sight viewing corridor extending perpendicular to the longitudinal axis from the neck support to the horizontal support member, the line-of-sight viewing corridor providing unobstructed visibility of the horizontal support member.

15. The shampoo support apparatus as recited in claim 14, wherein the top surface of the upper longitudinal length body segment and the top surface of the lower longitudinal length body segment, in combination, further comprise a size to accommodate a back of a child.

16. The shampoo support apparatus as recited in claim 14, wherein the body further comprises a booster seat configuration wherein the lower longitudinal length body segment folds along the flexure bearing hinge onto the upper longitudinal length body segment such that the lower end contacts the upper end.

17. The shampoo support apparatus as recited in claim 16, wherein in the booster seat configuration, the upper longitudinal length body segment including the cushioning material forms a first seat at the top surface, the lower longitudinal length body segment including the cushioning material forms a second seat at the bottom surface, and the body being a rectangular shape.

18. A shampoo support apparatus comprising:
a body having an upper end, a lower end, a top surface, a bottom surface, a first side, and a second side;
the top surface including an inclined plane and the top surface tapering from the upper end to the lower end;
the body including a longitudinal axis from the upper end to the lower end, the longitudinal axis having a longitudinal length;
the body including a cushioning material forming a neck support at an intersection of the upper end and the top surface, the cushioning material forming an upper back support on the top surface from the neck support to the lower end;
an outer cover providing an envelope over the cushioning material, the outer cover including a water-resistant polymer;
a support structure consisting essentially of a vertical support member supporting a horizontal support member, the horizontal support member being supported at a smart device working distance from the neck support, the horizontal support member having a connector securable to a plurality of positions along the horizontal support member, the connector configured to accept and secure a smart device thereat; and
a line-of-sight viewing corridor extending perpendicular to the longitudinal axis from the neck support to the horizontal support member, the line-of-sight viewing corridor providing unobstructed visibility of the horizontal support member.

19. The shampoo support apparatus as recited in claim 18, further comprising:
a first strap secured to the first side at the upper longitudinal length body segment, the first strap having a first fastener portion configured to mate with a second fastener portion;
a second strap secured to the second side at the upper longitudinal length body segment, the second strap having the second fastener portion; and the first strap and the second strap, when fastened, have a girth for securing a torso of a child therein and against the top surface of the upper longitudinal length body segment.

20. The shampoo support apparatus as recited in claim 18, wherein the top surface of the upper longitudinal length body segment and the top surface of the lower longitudinal length body segment, in combination, further comprise a size to accommodate a back of a child.

\* \* \* \* \*